(12) United States Patent
Lee

(10) Patent No.: US 10,060,577 B2
(45) Date of Patent: Aug. 28, 2018

(54) FUEL GAS STORAGE TANK WITH SUPPORTING FILTER TUBE(S)

(71) Applicant: Alternative Fuel Containers, LLC, Southfield, MI (US)

(72) Inventor: Joong-Kyu Lee, Chatham (CA)

(73) Assignee: Alternative Fuel Containers, LLC, Southfield, MI (US)

( * ) Notice: Subject to any disclaimer, the term of this patent is extended or adjusted under 35 U.S.C. 154(b) by 16 days.

(21) Appl. No.: 15/032,472

(22) PCT Filed: Oct. 28, 2014

(86) PCT No.: PCT/US2014/062588
§ 371 (c)(1),
(2) Date: Apr. 27, 2016

(87) PCT Pub. No.: WO2015/065984
PCT Pub. Date: May 7, 2015

(65) Prior Publication Data
US 2016/0273712 A1    Sep. 22, 2016

Related U.S. Application Data

(60) Provisional application No. 61/896,486, filed on Oct. 28, 2013.

(51) Int. Cl.
*F17C 11/00* (2006.01)
*B01J 8/02* (2006.01)
(Continued)

(52) U.S. Cl.
CPC .......... *F17C 11/007* (2013.01); *B01D 46/002* (2013.01); *B01D 46/2403* (2013.01);
(Continued)

(58) Field of Classification Search
CPC ...... B01D 50/00; H01M 8/24; H01M 8/2404; H01M 8/8484; H01M 8/2485;
(Continued)

(56) References Cited

U.S. PATENT DOCUMENTS 4,548,044 A * 10/1985 Sakai .................... C01B 3/0005
123/DIG. 12
4,583,638 A * 4/1986 Bernauer .............. F17C 11/005
206/0.7
(Continued)

FOREIGN PATENT DOCUMENTS

EP          1477717 B1     1/2008

OTHER PUBLICATIONS

Search Report and Written Opinion of the International Searching Authority (ISA/KR) for PCT/US2014/062588 dated Feb. 4, 2015.

*Primary Examiner* — J. Gregory Pickett
*Assistant Examiner* — Gideon Weinerth
(74) *Attorney, Agent, or Firm* — Reising Ethington P.C.

(57) ABSTRACT

A conformable fuel gas storage tank includes a shell, a fuel gas storage material, and one or more filter tube(s). The fuel gas can be natural gas or hydrogen gas. The shell defines an interior, and the fuel gas storage material is located within the interior. The filter tube permits fuel gas to diffuse out of filter tubes and into the interior of the tank and, additionally, supports the tank against outwardly-directed forces resulting from pressure within the interior of the shell.

16 Claims, 5 Drawing Sheets

(51) Int. Cl.
*B01D 46/00* (2006.01)
*B01D 46/24* (2006.01)
*B01D 46/42* (2006.01)
*H01M 8/2404* (2016.01)
*H01M 8/24* (2016.01)
*B60K 15/03* (2006.01)
*H01M 8/2475* (2016.01)

(52) U.S. Cl.
CPC .......... *B01D 46/4218* (2013.01); *B60K 15/03* (2013.01); *B60K 15/03006* (2013.01); *F17C 2205/0341* (2013.01); *F17C 2205/0352* (2013.01); *F17C 2205/0391* (2013.01); *F17C 2221/033* (2013.01); *F17C 2270/01* (2013.01); *H01M 8/24* (2013.01); *H01M 8/2404* (2016.02); *H01M 8/2475* (2013.01); *Y02E 60/321* (2013.01); *Y10T 137/86212* (2015.04)

(58) Field of Classification Search
CPC .. H01M 8/2465; H01M 8/247; H01M 8/2475; H01M 8/248; H01M 8/2483; H01M 8/2484; F17C 11/00; F17C 11/007; F17C 2205/0341; F17C 2205/0391; F17C 2205/0352; F17C 2205/0305; Y02E 60/321; Y02E 60/324; B60K 15/03006; B60K 15/03177; B60K 15/03; B60K 2015/03493; B60K 2015/0344; B65D 11/08; B65D 25/005; Y10T 137/86212
USPC ........ 206/0.7; 220/562, 592, 560.04–560.15; 96/108, 121, 126, 151, 154; 429/460, 429/507, 515; 62/46.1, 46.2
See application file for complete search history.

(56) References Cited

U.S. PATENT DOCUMENTS

| | | | | |
|---|---|---|---|---|
| 4,598,836 A * | 7/1986 | Wessel | C01B 3/0005 | 206/0.7 |
| 4,667,815 A * | 5/1987 | Halene | C01B 3/0005 | 206/0.6 |
| 5,462,193 A * | 10/1995 | Schoo | F17C 1/02 | 220/652 |
| 5,577,630 A * | 11/1996 | Blair | B60K 15/03006 | 220/23.2 |
| 5,647,503 A * | 7/1997 | Steele | B29C 70/24 | 220/589 |
| 5,758,796 A * | 6/1998 | Nishimura | F17C 1/06 | 220/590 |
| 5,985,002 A | 11/1999 | Grantham | | |
| 6,015,041 A * | 1/2000 | Heung | C01B 3/0005 | 206/70 |
| 6,432,379 B1 | 8/2002 | Heung | | |
| 6,461,756 B1 * | 10/2002 | Blanchet | H01M 8/2485 | 429/460 |
| 6,503,584 B1 * | 1/2003 | McAlister | F17C 1/02 | 220/560.04 |
| 6,696,193 B2 * | 2/2004 | Bonk | H01M 8/2485 | 429/459 |
| 6,997,242 B2 * | 2/2006 | Fujita | F17C 11/005 | 165/104.12 |
| 7,431,756 B2 * | 10/2008 | Myasnikov | C01B 3/0005 | 206/0.7 |
| 7,731,051 B2 * | 6/2010 | Rohwer | F17C 13/04 | 220/582 |
| 9,050,575 B2 * | 6/2015 | Rigaud | F25B 17/08 | |
| 9,905,878 B2 * | 2/2018 | Nishiyama | H01M 8/2475 | |
| 2005/0183424 A1 | 8/2005 | Bradley et al. | | |
| 2005/0208362 A1 * | 9/2005 | Petty | H01M 8/247 | 429/460 |
| 2007/0180998 A1 * | 8/2007 | Arnold | B01D 53/0431 | 96/108 |
| 2008/0168776 A1 * | 7/2008 | Arnold | F17C 1/14 | 62/46.1 |
| 2009/0017346 A1 * | 1/2009 | Laurent | C01B 3/065 | 429/410 |
| 2009/0029232 A1 * | 1/2009 | Petty | H01M 8/248 | 429/460 |
| 2009/0107853 A1 * | 4/2009 | Tan | B82Y 30/00 | 206/0.7 |
| 2009/0229555 A1 * | 9/2009 | Ginzburg | B01D 53/0407 | 123/1 A |
| 2009/0283176 A1 * | 11/2009 | Berry | F17C 13/001 | 141/1 |
| 2010/0024542 A1 * | 2/2010 | Yen | F17C 11/005 | 73/290 R |
| 2010/0219087 A1 * | 9/2010 | Fujita | F17C 11/005 | 206/0.7 |
| 2011/0041519 A1 * | 2/2011 | McAlister | F17C 11/005 | 62/46.1 |
| 2013/0273452 A1 * | 10/2013 | Barton | H01M 8/2465 | 429/469 |
| 2014/0061066 A1 * | 3/2014 | Chung | F17C 1/12 | 206/0.6 |
| 2014/0166664 A1 * | 6/2014 | Lin | B60K 15/03006 | 220/562 |
| 2015/0008145 A1 * | 1/2015 | Gillia | F17C 11/005 | 206/0.7 |
| 2015/0258487 A1 * | 9/2015 | Hornbostel | F17C 11/005 | 206/0.7 |
| 2015/0270562 A1 * | 9/2015 | Naito | H01M 8/04201 | 429/458 |
| 2015/0308623 A1 * | 10/2015 | Li | F17C 11/007 | 206/0.7 |
| 2016/0185210 A1 * | 6/2016 | Lee | B60K 15/07 | 180/69.5 |
| 2016/0201853 A1 * | 7/2016 | Weickert | F17C 11/007 | 206/0.7 |
| 2016/0273712 A1 * | 9/2016 | Lee | F17C 11/007 | |
| 2016/0273713 A1 * | 9/2016 | Lee | F17C 11/007 | |
| 2017/0028842 A1 * | 2/2017 | Lee | B60K 15/03006 | |

* cited by examiner

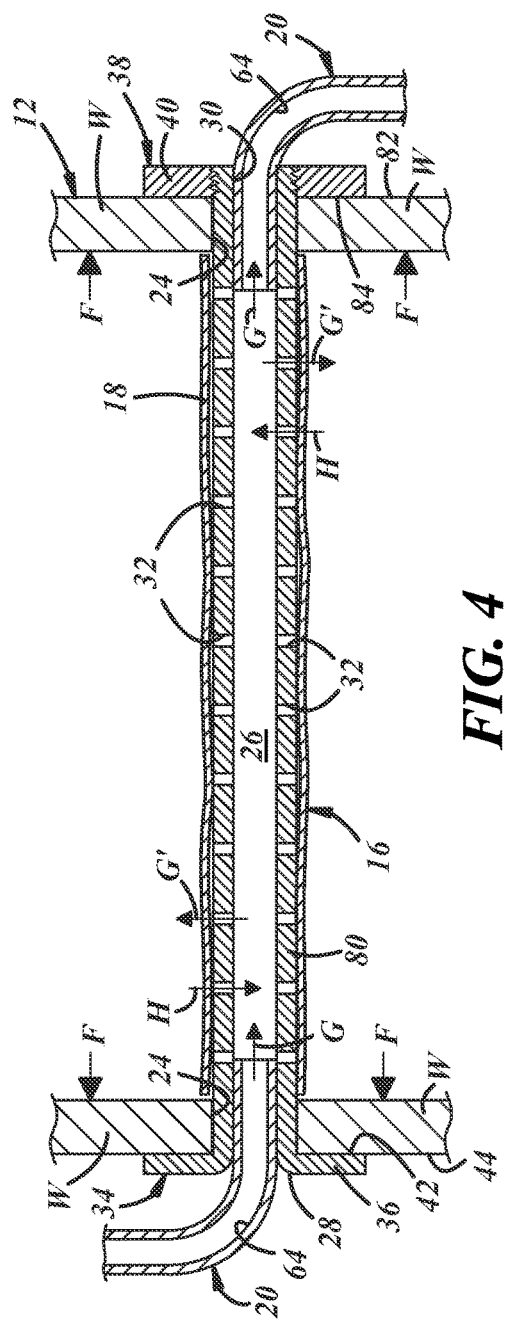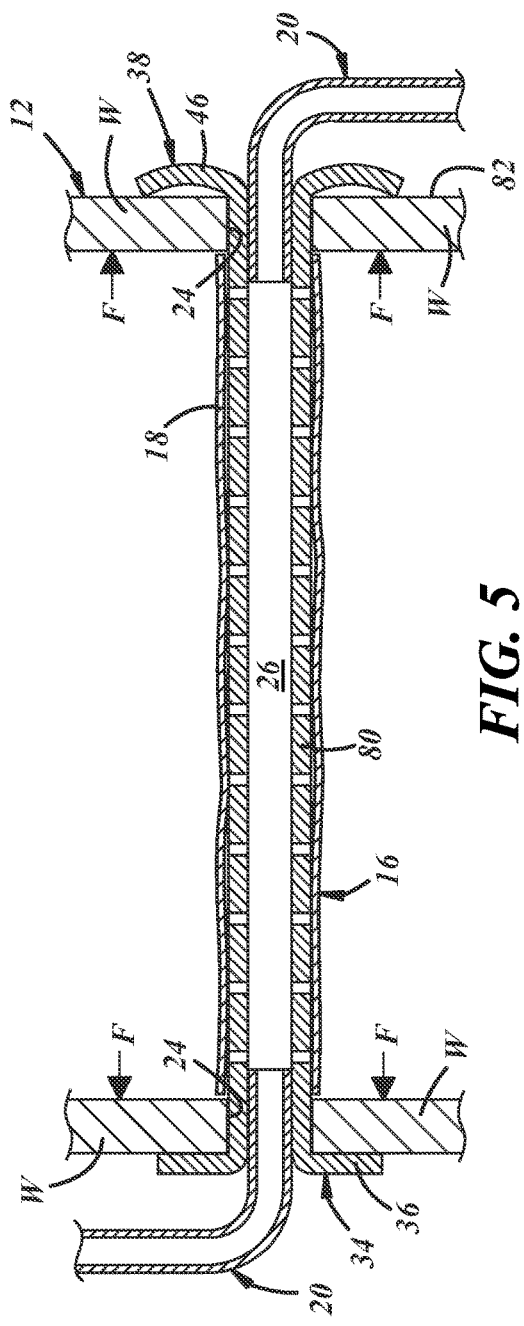

FUEL GAS STORAGE TANK WITH SUPPORTING FILTER TUBE(S)

CROSS-REFERENCE TO RELATED APPLICATIONS

This application claims the benefit of U.S. provisional patent application No. 61/896,486 filed on Oct. 28, 2013, the entire contents of which are incorporated herein by reference.

TECHNICAL FIELD

The technical field of this disclosure relates generally to a tank for storing alternative fuel gas such as natural gas or hydrogen gas.

BACKGROUND

Fuel gases, such as natural gas and hydrogen gas, are promising alternatives to the traditional petroleum-based energy sources consumed by automotive vehicles. They are generally cleaner burning than traditional petroleum-based gasoline and diesel fuels and, thus, are better for the environment. One challenge encountered with the use of fuel gases, however, is how to store a sufficient amount of fuel gas aboard an automotive vehicle so that reasonable driving distances can be achieved between fill-ups. To this end, two storage approaches are typically employed when attempting to satisfy mobile on-board vehicle fuel gas storage needs: storing fuel gas in a compressed state or a solid state.

Natural gas, for instance, can be stored in a compressed state (compressed natural gas or CNG) or an adsorbed state (adsorbed natural gas or ANG). Compressed natural gas is stored at high pressures to less than 1% of the volume it would normally occupy at standard temperature and pressure (STP). Tank pressures of 150 bar to 250 bar are typically needed to achieve this level of compression. Adsorbed natural gas relies on a natural gas storage material that can adsorb and store natural gas in a solid state at an energy density comparable to compressed natural gas but at a much lower tank pressure of 60 bar or less. In a similar vein, hydrogen gas can be stored in a compressed state or by chemical uptake at an energy density comparable to compressed hydrogen gas but at a much lower tank pressure. Storing hydrogen gas by chemical uptake involves reversibly charging hydrogen gas on a storage material such as a metal hydride or a complex metal hydride like various alanates and amides. The solid state storage of natural gas and hydrogen gas on an ANG storage material and a hydrogen storage material, respectively, share similar thermodynamics in that the adsorption/chemical uptake processes are exothermic in nature while their eventual release is endothermic.

A design consideration that factors into the commercial demand and viability of on-board fuel gas storage tanks that utilize a gas storage material—and all vehicle fuel tanks for that matter—is "conformability." The concept of tank conformability relates to the flexibility of the tank structure and how easily it can be adapted to fit the available packing requirements across many different vehicle platforms. The fuel gas storage tanks employed to date—for both compressed and solid state fuel gas storage—have largely been shaped as cylinders or spheres and are oftentimes made of thick and/or heavy materials. These tank constructions have been used to resist the forces exerted by the associated pressures from inside the tanks. But cylindrically- and spherically-shaped storage tanks are generally considered to be quite non-conformable since they do not always satisfy packaging requirements demanded in automotive vehicles and/or they are unable to fully utilize the space designated for the tank on a vehicle platform. The use of thick and/or heavy materials to fabricate the tank can also make the tank too heavy for some vehicle applications.

SUMMARY

A conformable fuel gas storage tank is disclosed for storing fuel gas such as natural gas or hydrogen gas. The storage tank has a shell that defines a tank interior, has a fuel gas storage material located in the shell, and can have one or more filter tubes. When natural gas is being stored, the fuel gas storage material is an adsorbed natural gas (ANG) storage material that stores natural gas in a solid state by way of adsorption. Examples of ANG storage materials include activated carbon, metal-organic-frameworks (MOFs), and porous polymer networks (PPNs). When hydrogen gas is being stored, the fuel gas storage material is a hydrogen gas storage material that stores hydrogen gas in a solid state by way of chemical uptake. Examples of hydrogen gas storage materials include metal hydrides and complex metal hydrides such as sodium alanates, lithium alanates, and amides.

The one or more filter tubes perform several functions. Indeed, when more than one filter tubes are employed, they form part of a larger fuel gas transport system that conveys fuel gas into and out of the storage tank. The filter tubes define flow passages along which fuel gas can travel and further include openings that permit fuel gas to diffuse out of filter tubes and into the interior of the tank so that the fuel gas can be charged and stored in the fuel gas storage material. The filter tubes also support the shell against outwardly-directed forces resulting from pressure exerted from within the tank interior. Because of this support against the internal pressure forces, the storage tank can be designed to more readily satisfy packaging demands and weight requirements that are oftentimes imposed by automotive manufacturers and that exist in other industries.

The filter tubes can have a multi-piece construction or a single-piece construction. Multi-piece examples include filter tubes with a structural wall and a membrane or a mesh structure carried by the structural wall. Single-piece examples include filter tubes with only a structural wall, only a membrane, or only a mesh structure. Whatever the construction, the structural wall has openings in the form of small holes, slits or some other gas-navigable openings through which fuel gas can diffuse. Similarly, the membrane, if used, is fuel gas permeable, and the mesh structure, also if used, has openings defined by interconnecting strands, perforations, or the like to render it fuel gas porous. The filter tubes are thus able to direct a flow of fuel gas through their respective gas flow passages while allowing some of the fuel gas to diffuse out of their flow passages and into the tank interior.

BRIEF DESCRIPTION OF THE DRAWINGS

FIG. 4 is a sectional view of an embodiment of a filter tube that can be used with the conformable fuel gas storage tank depicted in FIG. 1;

FIG. 5 is a sectional view of another embodiment of a filter tube that can be used with the conformable fuel gas storage tank depicted in FIG. 1;

DETAILED DESCRIPTION

Figure 10:
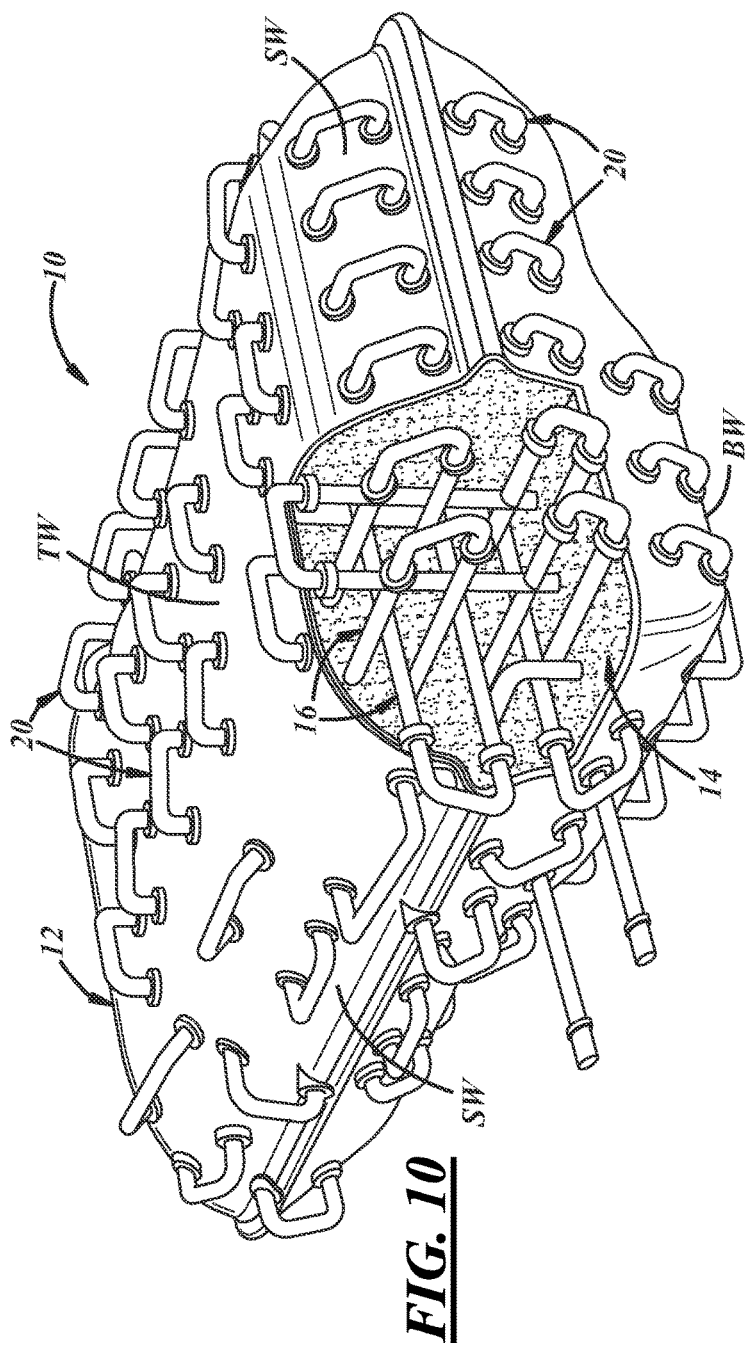
FIG. 10 is a partial cut-away view of an embodiment of a conformable fuel gas storage tank.

The fuel gas storage tank detailed in this description addresses challenges associated with storing fuel gas aboard a vehicle such as an automobile—namely, the sometimes demanding and even inflexible packaging and weight requirements specified for the tank. As will be described in more detail below, the fuel gas storage tank is "conformable" in the sense that its shape is not limited to cylinders and spheres, though these shapes are still acceptable possibilities, and instead its shape can include generally planar portions and surfaces like those in a polygonal three-dimensional shape that better accommodate packaging and spacing needs in vehicle applications. The term "planar," as used herein, refers to surfaces that need not present dimensionally exact planes, and instead can deviate from flat and present curvatures like those surfaces illustrated in the example of FIG. 10. Furthermore, thinner and lighter materials can be used to make the fuel gas storage tank, if desired, since the tank is designed to better resist internal forces exerted by the pressurized fuel gas stored inside the tank.

Figure 1:
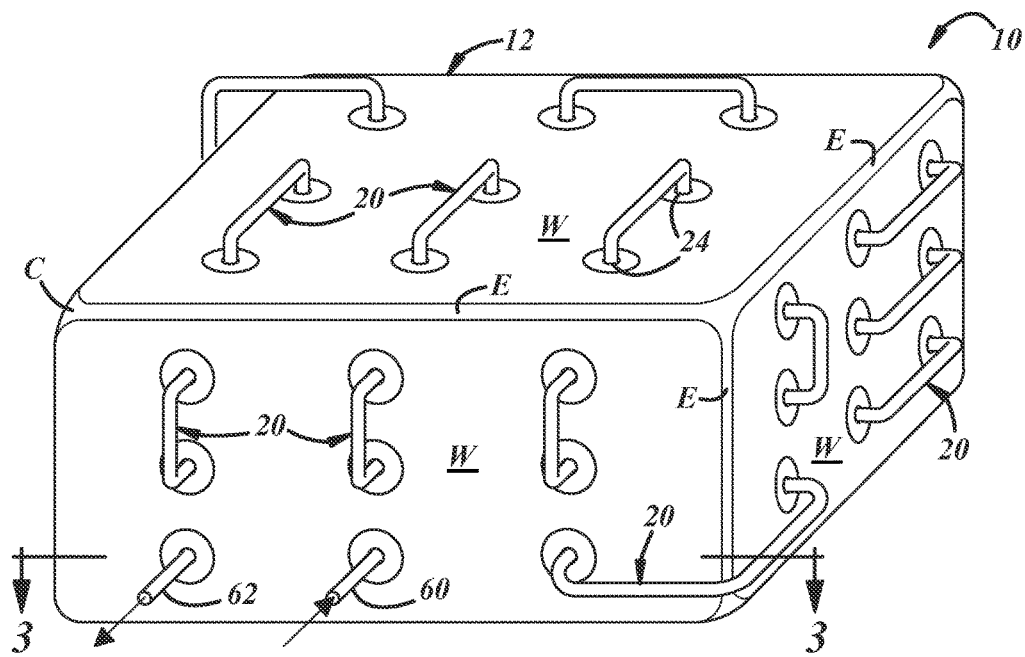
FIG. 1 is a perspective view of an embodiment of a conformable fuel gas storage tank.
Figure 2:
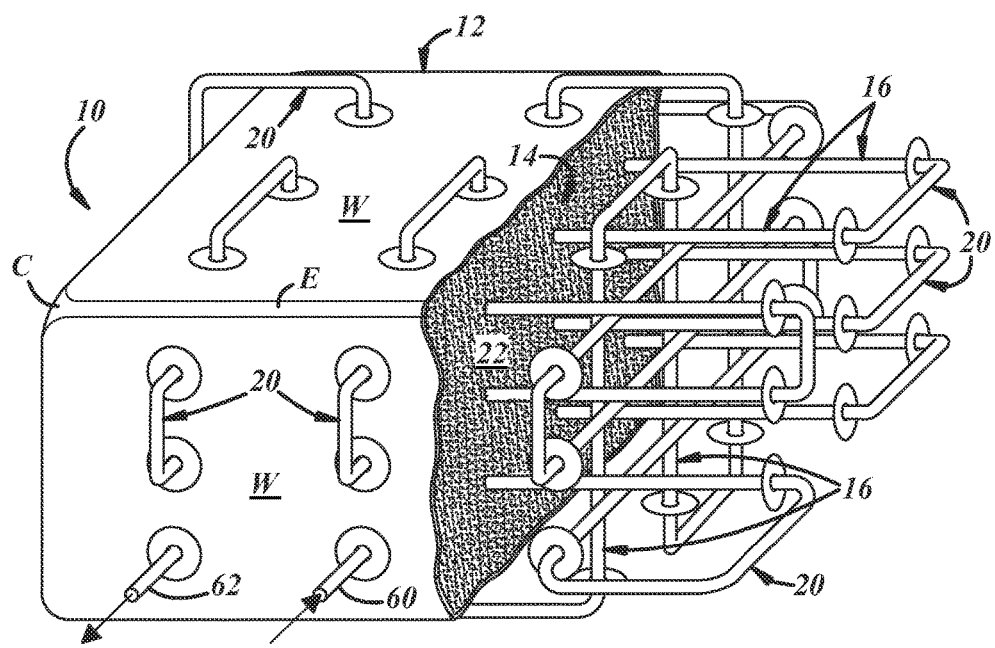
FIG. 2 is a partial cut-away view of the conformable fuel gas storage tank depicted in FIG. 1, showing some internal components of the tank.
Figure 3:
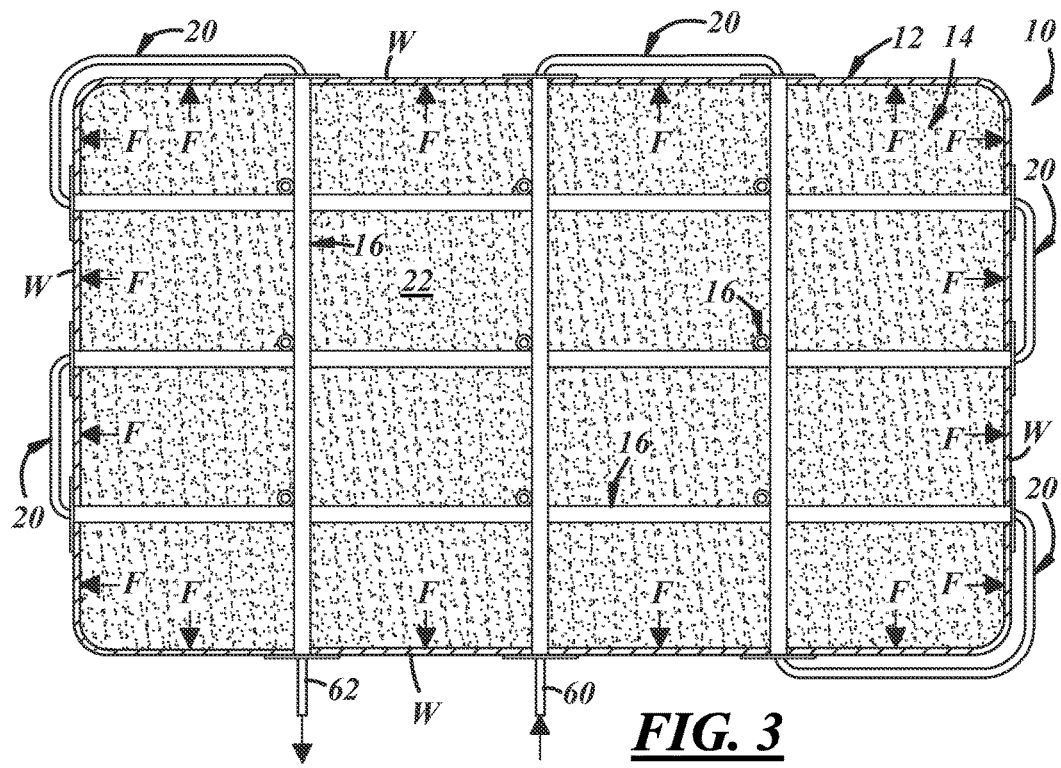
FIG. 3 is a sectional view of the conformable fuel gas storage tank depicted in FIG. 1 taken at arrows 3-3.

FIGS. 1-3 illustrate one embodiment of a conformable fuel gas storage tank 10 that is used to store and hold fuel gas aboard a vehicle. The conformable fuel gas storage tank 10 can have different designs, constructions, and components depending upon the capacity, packaging, and weight specifications of the vehicle to which the tank is equipped. In the embodiment depicted in FIGS. 1-3, the conformable fuel gas storage tank 10 includes a shell 12, a fuel gas storage material 14, filter tubes 16, and connecting pipes 20.

The shell 12 provides a physical structure that houses the fuel gas storage material 14 and supports other components of the conformable fuel gas storage tank 10. A number of materials can be used to make the shell 12 including a metal such as a stainless steel like SUS304 grade stainless steel or an aluminum alloy like AA5083-0 aluminum alloy. The construction of the shell 12, however, is not limited to metal constructions and can be made from a plastic such as carbon-fiber reinforced nylon, or it can be made from some other material of suitable strength and durability. The material selected for construction of the shell 12 can be lighter and/or thinner than those which have been conventionally used for conventional gas storage tanks since, as will be further described below, the filter tubes 16 provide added support and structural integrity to the shell 12.

The shell 12 includes walls W that define a tank interior 22 where the fuel gas storage material 14 is contained. The walls W define multiple openings 24 through which the filter tubes 16 are received into the interior 22 of the shell 12. The openings 24 can be formed during manufacture of the shell 12, they can be drilled into the walls W after the shell 12 has been made, or they can be formed another way depending on the material of the shell 12. When fuel gas is stored within the shell 12, outwardly-directed forces F (FIG. 3) act against the shell walls W due to the pressure of the stored fuel gas contained in the tank interior 22. The forces F can impart bending stresses, hoop stresses, and other stresses on the walls W. As will be described below in greater detail, the filter tubes 16 are hermetically coupled to the walls W in a way that counteracts the forces F imparted to the walls W by the fuel gas, and they do so to such an extent that one or more walls W of the shell 12 can include planar portions or surfaces and need not necessarily be cylindrically- and spherically-shaped, if desired. The walls W can also have a thickness that is rather small compared to conventional practice. For example, the thickness of the walls W can range from about 3 millimeters (mm) to about 10 mm, or from about 3 mm to 5 mm. Other thickness dimensions are possible and may depend on the material used for the shell 12 and the overall size and shape of the shell 12.

In the example presented by FIGS. 1-3, the shell 12 is illustrated as having a rectangular shape with six generally planar walls W. Here, as shown, the walls W intersect one another along edges E that meet at corners C. The edges E and corners C of the shell 12 are preferably rounded for improved resistance against bending stresses experienced at those regions of the shell 12 due to the pressure of the fuel gas held inside the tank 10, which can range from about 35 bar to about 60 bar for ANG storage, or can range from about 10 bar to about 100 bar for hydrogen storage. In the example shell 12 presented by FIG. 10, the shell has walls BW, TW, SW that include planar portions or surfaces within the meaning of that term as used herein. Its bottom and top walls BW, TW curve slightly into its side walls SW. In embodiments not shown, but which will nonetheless be apparent to skilled artisans, the shell 12 could have still different shapes with different shaped walls. For example, the shell 12 could have a spherical shape made of a single wall, could have a cylindrical shape with a cylinder wall and two spherical end walls, or could have a polygonal three-dimensional shape with any number of generally planar and non-planar walls or walls that have planar portions or surfaces. The option to employ walls with at least planar portions or surfaces in the construction of the shell 12—which allows the shell 12 to assume any of a wide variety of shapes beyond the cylindrical and spherical shapes that have conventionally been used for storage—allows the tank 10 to be designed in a way that best conforms to the space allotted for the tank 10 on a particular vehicle platform.

The fuel gas storage material 14 is located within the shell 12 and augments the storage capacity of the conformable fuel gas storage tank 10. Referring now to FIGS. 2 and 3, the fuel gas storage material 14 fully occupies the tank interior 22 of the shell 12 and is enveloped around the filter tubes 16. The precise design, construction, and composition of the fuel gas storage material 14 will depend in part upon the type of fuel gas being stored in the storage tank 10. In one embodiment, the fuel gas can be natural gas, which is a combustible fuel whose largest gaseous constituent is methane ($CH_4$). The preferred type that is employed here for storage in the fuel gas storage tank 10 is refined natural gas that includes 95 wt. % methane or greater. The other 5 wt.

% or less may include varying amounts of natural impurities—such as other higher-molecular weight alkanes, carbon dioxide, and nitrogen—and/or added impurities such as a mercaptan and water.

When the fuel gas is natural gas, the fuel gas storage material 14 can be an ANG storage material such as any adsorbent material that can adsorb and release natural gas. The ANG storage material can be incorporated into the conformable fuel gas storage tank 10 in granulized form, powderized form, or any other suitable form. Some specific examples of materials that can comprise some or all of the ANG storage material are activated carbon, metal-organic-frameworks (MOF), or porous polymer networks (PPN). Activated carbon is a carbonaceous substance, typically charcoal, that has been activated by known physical or chemical techniques to increase its porosity and surface area. A metal-organic-framework is a hybrid organic-inorganic coordinated polymeric framework, often a three-dimensional network, in which metal ions (or clusters) are connected by organic linking molecules to provide a porous, and typically three-dimensional, molecular structure. Many different types of MOFs that are able to reversibly adsorb natural gas are commercially available in the marketplace and newly-identified MOFs are constantly being researched and developed. A porous polymer network is a covalently-bonded organic or organic-inorganic interpenetrating polymer network that, like MOF's, provides a porous and typically three-dimensional molecular structure. Some notable MOF's and PPN's that may be used are disclosed in R. J. Kuppler et al., Potential Applications of Metal-Organic Frameworks, Coordination Chemistry Reviews 253 (2009) pp. 3042-66, D. Yuan et al., Highly Stable Porous Polymer Networks with Exceptionally High Gas-Uptake Capacities, Adv. Mater. 2011, vol. 23 pp. 3723-25, and W. Lu et al., Porous Polymer Networks: Synthesis, Porosity, and Applications in Gas Storage/Separation, Chem. Mater. 2010, 22, 5964-72.

In another embodiment, the fuel gas can be hydrogen gas, which is a diatomic gas having the chemical formula $H_2$. When the fuel gas is hydrogen gas, the fuel gas storage material 14 can be a hydrogen gas storage material in which hydrogen gas is stored in a solid state by chemical uptake or by adsorption. The hydrogen gas storage material can be a metal hydride or a complex metal hydride including various known alanates and amides. One specific example of suitable metal hydride is lithium hydride (LiH). And some specific complex metal hydrides include sodium alanate ($NaAlH_4$), lithium alanate ($LiAlH_4$), magnesium nickel hydride ($Mg_2NiH_4$), and lithium amide ($LiNH_2$). MOFs and PPNs as referenced in the above literature may be used for hydrogen storage, although the storage mechanism associated with such materials is by way of adsorption rather than chemical uptake.

The filter tubes 16 can extend into and through the fuel gas storage material 14 and preferably extends across the tank interior 22 between two portions of the shell 12. The filter tubes 16 are multi-functional in that they (1) transport a flow of fuel gas into and out of the conformable fuel gas storage tank 10, (2) enable the diffusion of fuel gas from inside the filter tube 16 to outside the filter tube 16 and the transfer of heat H from outside the filter tube 16 to inside the filter tube 16, and (3) support the shell 12 against the outwardly-directed forces F acting from the tank interior 22. Because of their ascribed multi-functionality, the fuel gas storage tank 10 is conformable in nature and may also be filled and re-filled relatively quickly since the filter tubes 16 provide a mechanism for rejecting heat out of the tank 10 that is generated by the exothermic adsorption/chemical uptake of the fuel gas by the fuel gas storage material 14.

Referring specifically now to FIGS. 2-3, the filter tubes 16 are arrayed through the shell 12 and through the fuel gas storage material 14 for adequate delivery of fuel gas to all parts of the fuel gas storage material 14. There can be any number of filter tubes 16 installed in the conformable fuel gas storage tank 10 and crisscrossing one another. The exact number of filter tubes 16 provided may depend on the shape and size of the tank 10, the expected magnitude of the forces F experienced, and the desired pitch between adjacent tubes 16. In the illustrated fuel gas storage tank 10, each filter tube 16 extends from a generally planar portion of one wall W to a generally planar portion of another wall W, with the two planar wall portions being situated opposite from each other. In the example of a spherically-shaped shell and a cylindrically-shaped shell, however, one or more of the filter tubes 16 could extend between two different portions of the same wall.

The exact design and construction of each filter tube 16 can vary among different applications. In the embodiment of FIG. 4, each filter tube 16 can have a structural wall 80 that defines a flow passage 26 for directing a bulk flow of fuel gas G from an inlet 28 to an outlet 30, and can have a membrane 18 carried by the structural wall 80. The bulk fuel gas G can flow within and along the flow passage 26 without having to directly contact and navigate the fuel gas storage material 14 contained in the tank interior 22. As the bulk fuel gas flow G travels along the flow passage 26, the structural wall 80 and the membrane 18 together allow some fuel gas G' to diffuse from within the flow passage 26 to outside of the filter tube 16 where it can be stored in a solid state by the fuel gas storage material 14. The structural wall 80 and the membrane 18 also allow heat H that is generated during the storage fuel gas storage process (e.g., exothermic adsorption of natural gas or exothermic chemical uptake of hydrogen gas) to transfer from outside the filter tube 16 to inside the filter tube 16 where it can be captured and carried away by the bulk fuel gas flow G moving along the flow passage 26.

The structural wall 80 is preferably cylindrical in shape and marked with openings in the form of small holes 32 in FIG. 4 for the passage of some fuel gas G' from the flow passage 26 through the wall 80. The holes 32 can be regularly and uniformly spaced perforations all along the cylindrical body of the filter tube 16. In some examples, the flow passage 26 can have a diameter ranging from about 3 mm to about 10 mm or from about 5 mm to about 30 mm, the holes 32 can have a diameter ranging from about 10 µm to about 2 mm, and the structural wall 80 can have a thickness from about 1.0 mm to about 5.0 mm. Still, in other examples, the flow passage 26 and the holes 32 could have diameters of different values, and the structural wall 80 may have a different thickness, depending on the size of the fuel gas storage tank 10 and on properties of the fuel gas storage material 14, among other possible factors. The structural wall 80 can be made of the same material as the shell 12, like the metal and plastic materials set forth above, or it could be composed of some other material that has suitable strength. Carbon steel materials could also be used.

The membrane 18 carried by each structural wall 80 provides a finer filtration medium compared to the openings in the structural wall 80. The membrane 18 is preferably a micro- or ultra-filtration material or film that is fuel gas permeable so that the fuel gas G' removed from the bulk flow G can diffuse through the membrane 18 and out of the filter tube 16 for storage by the fuel gas storage material 14. A network of interconnected pores preferably traverses a thickness of the membrane 18, which typically ranges from about 20 μm to about 2 mm. While the pores are sized to allow diffusion of the fuel gas G' from the flow passage 26 of the filter tube 16 to the fuel gas storage material 14 located outside of the filter tube 16, their size may also be tailored to preclude pieces of the fuel gas storage material 14 above a certain size from passing through the filter tube 16 into the flow passage 26. For instance, the pores of the membrane 18 may be sized to exclude particles of the fuel gas storage material 14 down to a certain size that may result from fragmentation of the material 14—which can be caused over time by temperature, pressure, and load cycling—from passing through the thickness of the membrane 18. In some examples, an average pore size of about 10 μm to about 50 μm may be suitable. The membrane 18 need not, however, necessarily prevent all traces of fuel gas storage material 14 from the fuel gas entering the filter tube 16 from the tank interior 22 as it may be acceptable for tiny particles of the fuel gas storage material 14 to enter the flow passage 26 without measurably impacting the effectiveness of the fuel gas storage tank 10 and the filter tubes 16.

A number of micro- or ultra-filtration materials exist and are known in the art to be fuel gas permeable. Of these many choices, the membrane 18 is preferably a hydrophilic zeolite such as ZSM-5, which can help reduce water contamination of the fuel gas storage material 14, or an organic polymer-based membrane. The membranes 18 can be carried by the structural wall 80 in different ways. Referring to FIG. 4, for example, the membrane 18 is overlapped around the outside of the structural wall 80. Here, the membrane 18 surrounds all sides of the structural wall 80 and spans longitudinally over the extent of the wall 80 exposed to the fuel gas storage material 14. In another embodiment, the membrane 18 can be carried within the structural wall 80 on an inside circumferential surface of the wall 80 and within the flow passage 26, or it may be sandwiched between the structural wall 80 and another component of the filter tube 16. The membrane 18 can be appended to the structural wall 80 by any known technique.

In other embodiments, the filter tube 16 may include additional materials or discrete layers besides the structural wall 80 and the membrane 18. Or it may include the structural wall 80 alone without the membrane 18 in cases where the structural wall 80 itself can suitably preclude pieces of the fuel gas material 14 above a certain size—e.g., pieces that are above some predetermined size that may range from 10 μm to 50 μm or smaller or larger—from entering the flow passage 26 and obstructing flow in the filter tube 16. Additionally, the filter tube 16 may include the membrane 18 alone without the structural wall 80 in cases where the membrane 18 itself can suitably preclude pieces of the fuel gas material 14 above a certain size from entering the flow passage 26 obstructing flow in the filter tube 16. In such instances, the thickness of the membrane 18 may have to be increased to account for the absence of the structural wall 80. Whether the filter tube 16 includes both the structural wall 80 and membrane 18 or just one of them, the filter tube 16 need not necessarily prevent all traces of fuel gas storage material 14 from entering the flow passage 26, as previously explained.

Figure 11:
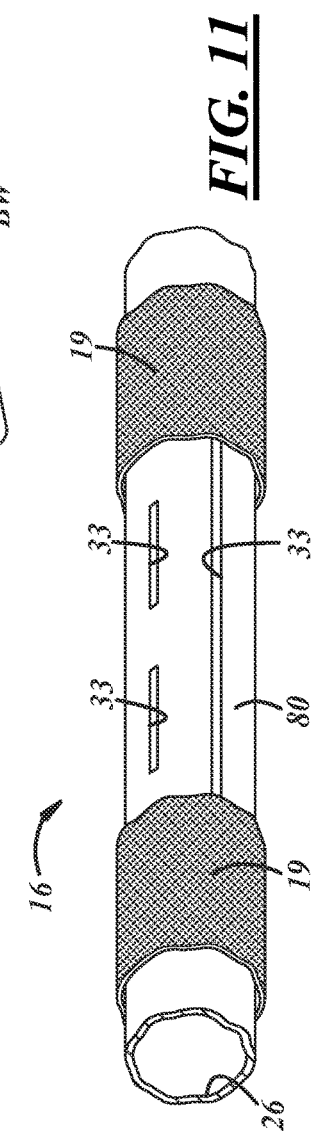
FIG. 11 is a segmented perspective view of an embodiment of a filter tube that can be used with the conformable fuel gas storage tank depicted in FIG. 1.

FIG. 11 depicts yet another embodiment of the filter tube 16. Here, the structural wall 80 has openings in the form of elongated slits 33. In different examples, there could be an elongated slit 33 spanning axially along the structural wall 80, as illustrated by the lowermost slit 33 in FIG. 11, there could be multiple elongated slits 33 arranged uniformly or randomly around the structural wall 80, as illustrated by the uppermost slits 33 in the figure, or there could be a combination thereof as well as openings of other shapes. The slitted structural wall 80 could constitute the filter tube 16 by itself, or, as partially shown in FIG. 11, a mesh structure 19 could be provided over the structural wall 80. The mesh structure 19 is depicted broken away in FIG. 11 to expose the structural wall 80 underneath, but could span completely across the structural wall 80 to fully surround the wall 80. In the embodiment illustrated, the mesh structure 19 is made of metal, and could be composed of a steel material or a stainless steel material like SUS304 stainless steel. The mesh structure may be a wire or woven mesh that defined gas-navigable openings, and it may function similarly to the membrane 18 described above in that it permits fuel gas to diffuse through it while at the same time precluded pieces of the fuel gas material 14 above a certain size—e.g., pieces that are above some predetermined size that may range from 10 μm to 50 μm or smaller or larger—from entering the flow passage 26 and obstructing flow in the filter tube 16.

In yet another embodiment, the metal mesh structure 19 could constitute the filter tube 16 by itself and without the structural wall 80. For the passing fuel gas G', the mesh structure 19 can have openings defined by interconnected wires or woven metal or it can have openings in the form of perforations. If the metal mesh structure defines openings of less than 50 μm in diameter, for example, then the membrane 18 may not be needed as part of the filter tube 16, as the metal mesh structure 19 may be sufficient to permit fuel gas diffusion into the tank interior 22 while also excluding pieces of the fuel gas storage material 14 above a certain size from entering into the flow passage 26. If a metal mesh structure is used as all or part of the filter tube 16, commercial providers of the structure could include the company Haver & Boecker of OELDE Germany, or Fratelli Mariani S.p.A. of Cormano Italy, as well as other companies.

The filter tubes 16 can be hermetically coupled at their ends to the walls W of the shell 12 by different ways, techniques, components, and processes. The exact coupling may depend on the materials selected for the filter tubes 16 and walls W, and the magnitude of forces F expected. The term "coupling" as used herein does not necessarily mean a mechanical interconnection between components like a bolt and nut threaded together, though does mean this in some embodiments, and instead merely means direct or indirect abutment between components like surfaces kept in contact with each other. Likewise, the term "engagement" as used herein means direct engagement between components such as abutment between surfaces of the components, and means indirect engagement between components such as where two components do not physically contact each other and rather transmit forces to each other by way of another component like a washer situated between the two components. These are mere examples of what the terms mean in some embodiments, and their definitions are broader and embody all of the embodiments detailed in this description.

In the embodiment depicted in FIG. 4, for example, the filter tube 16 has a first coupling 34 with a flange 36 and a second coupling 38 with a fitting 40. The flange 36 preferably has a circular shape that extends radially outwardly from a circumference of the structural wall 80. The flange 36 can be unitary with the structural wall 80 or it can be a discrete piece attached to the wall 80 by welding, adhesion, a mechanical interlock, or some other way. The fitting 40 on the opposite end of the filter tube 16 is preferably a nut that has inner threads engaged with, and tightened down on, outer threads that are disposed on the exterior of the structural wall 80.

The filter tube 16 in this embodiment is installed by inserting its threaded end through one of the openings 24 in one of the walls W, and then through the other opening 24 in the other wall W. An inner surface 42 of the flange 36 is seated against an outer surface 44 of its respective wall W. Similarly, the nut 40 is tightened down on the outer threads of the structural wall 80 of the filter tube 16, which protrudes past an outer surface 82 of its respective wall W, so that an inner surface of the nut 84 is seated against that outer wall surface 82. The engaged surfaces 42, 44 and 82, 84 therefore make surface-to-surface abutment in the embodiment of FIG. 4. And though not illustrated, one or more o-rings or other gaskets can be disposed against the outer shell surfaces 44, 82 to help seal the tube 16 and the shell 12. A cured epoxy sealant could also be disposed between the filter tube 16 and the shell 12 and/or one or more welds could be performed at the first and/or second couplings 34, 38 to help seal the tube 16 and the shell 12 and to further achieve a permanent fixation between the two components. If permanent fixing is not performed, and it does not necessarily have to be, the filter tube 16 can be decoupled and uninstalled from the shell 12 if necessary. In this way, the filter tubes 16 can be serviced and repaired or replaced during the useful lifetime of the conformable fuel gas storage tank 10.

FIG. 5 illustrates another embodiment of the filter tube 16 in which the second coupling 38 has a metal-worked portion 46 formed by a metalworking process. The metal-worked portion 46 can constitute a flange. Here, the metal-worked portion 46 is a flared terminal end of the structural wall 80 that would otherwise extend through the opening 24 of its respective wall W past the outer surface 82 of the wall W. The metal-worked portion 46 is preferably formed after insertion of the filter tube 16 through the shell 12. Specifically, it is formed by a metal spinning process that forcibly curls the terminal end of the structural wall 80 back into abutment with the outer surface 82 of the wall W. Other metal-worked portions and processes are possible in other embodiments. At its other end, the filter tube 16 has the same flange 36 as previously-described with reference to FIG. 4. Since the metal spinning process is performed after the filter tube 16 has been inserted through the openings 24 in the walls W, the embodiment of FIG. 5 provides a somewhat permanent fixing between the filter tube 16 and shell 12. And again, here, o-rings or gaskets or other sealing elements can be included to help provide a seal between the shell 12 and filter tube 16.

Figure 6:
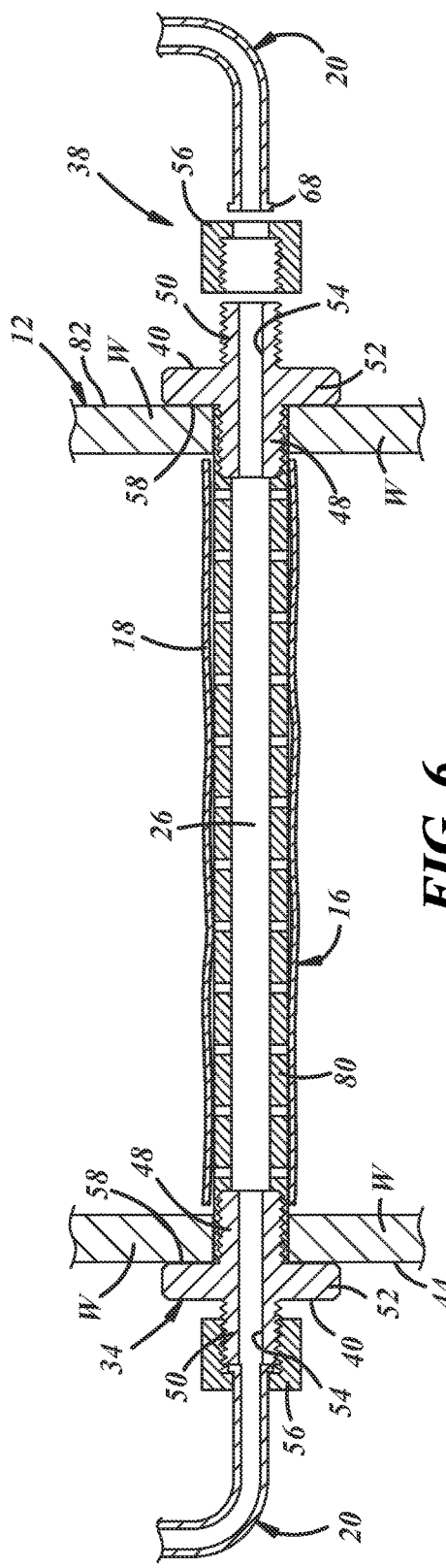
FIG. 6 is a sectional view of yet another embodiment of a filter tube that can be used with the conformable fuel gas storage tank depicted in FIG. 1.

FIG. 6 illustrates yet another embodiment of the filter tube 16 in which both of the first and second couplings 34, 38 have fittings 40 in the form of a t-fitting with a first and second stem 48, 50, a flange 52, and a passage 54 spanning through the t-fitting and communicating with the flow passage 26 of the filter tube 16. The first stem 48 has an outer thread that is engaged and tightened down with an inner thread of the filter tube 16, and the second stem 50 has an outer thread that is engaged and tightened down with an inner thread of a nut 56. In FIG. 6, and for demonstrative purposes only, the first coupling 34 is shown assembled and the second coupling 38 is shown unassembled with exploded components. The flange 52 can have a circular shape and can extend unitarily and radially outwardly from the first and second stems 48, 50. An inner surface 58 of each flange 52 is seated against the outer surfaces 44, 82 of each wall W so that the surfaces 44, 58 and 84, 58 make surface-to-surface abutment. The filter tube 16 can be decoupled and uninstalled from the shell 12 for servicing, if needed, by unscrewing the various components of the first and second couplings 34, 38 and removing the filter tube 16 from the shell 12. And again, as before, o-rings or gaskets or other sealing elements can be included to help provide a seal between the shell 12 and filter tube 16.

Still, in other embodiments not expressly shown here, the filter tubes 16 can have other couplings to the walls W. Other couplings can include other components like additional fittings, parts, gaskets, seals, washers, rivets, and clamps; can include other processes like press-fitting, welding, adhesion, curing, staking, and soldering; or can include a combination of these coupling components and processes, as well as those detailed elsewhere in this description. The filter tubes 16 can also be installed in the shell 12 by other techniques not expressly mentioned here such as, for example, by installing the tubes 16 from the interiors of two disjoined shell halves that are later joined together into the shell 12 by welding or heat fusion.

In addition to transporting fuel gas through the conformable fuel gas storage tank 10, and permitting the cross-movement of diffused natural gas G' and heat H between the flow passage 26 of the filter tube 16 and the interior 22 of the tank 10, the filter tubes 16 support the shell 12 against the forces F that result from the pressures experienced in the tank interior 22. The filter tubes 16 counteract the forces F acting on the walls W from the interior 22 of the shell 12 so that the walls W do not unacceptably bow or otherwise deform. In other words, the filter tubes 16 assist the walls W in exerting a suitable counter-force against the outwardly-directed forces F acting on the shell walls W and withstand the forces F. This functionality is provided in large part by the first and second couplings 34, 38 of the filter tubes 16 and their engagement with the walls W. While the couplings take different configurations and therefore can engage and provide the functionality in different ways, in the embodiment of FIG. 4 the inner surface 42 of the flange 36 engages and abuts the outer surface 44 of the wall W and accordingly supports the wall against the forces F near that portion of the wall W. On the other side of the filter tube 16 at the second coupling 38, the inner surface 84 of the nut 40 similarly engages and abuts the outer surface 82 of the wall W and supports that portion of the wall against the forces F. In the embodiment of FIG. 5, it is engagement and abutment between the flange 36 and wall W, and between the metal-worked portion 46 and wall W that support the two walls W against the forces F acting from the tank interior 22. And in the embodiment of FIG. 6, it is engagement and abutment between the flanges 52 and the respective walls W that support the wall against the forces F. Still, in other embodiments, a flange or other component embedded inside of and completely enveloped by the wall W could constitute the engagement that supports the wall against the forces F, among other possibilities.

The filter tubes 16 are fluidly connected by the connecting pipes 20. A single pipe 20 is routed between a pair of filter tubes 16 exterior to the shell 12 in order to transport fuel gas between the flow passages 26 of the filter tubes 16. Referring now back to FIGS. 1-4, enough connecting pipes 20 are supplied to fluidly connect all of the filter tubes 16. Together, the connecting pipes 20 and filter tubes 16 constitute a fuel gas transport system that directs fuel gas into the conformable fuel gas storage tank 10 through an inlet 60, routes the fuel gas back-and-forth through the interior 22 of the shell 12 for good exposure to all parts of the fuel gas storage material 14, and out of the tank 12 and eventually downstream to other components through an outlet 62. The connecting pipes 20 do not include openings and do not permit gas diffusion through their walls like the filter tubes 16; instead, each connecting pipe 20 has a solid body that defines a passage 64, as shown best in FIG. 4. The walls that make up the solid body of the connecting pipes 20 can have a thickness that ranges from about 0.5 mm to about 1 mm, and they can provide the connecting pipes 20 with a diameter to an outer surface that ranges from about 3 mm to about 10 mm or from about 5 mm to about 30 mm. Of course other thickness and diameter values are possible. The connecting pipes 20 can be made from the same material as the structural wall 80 of the filter tubes 16 or they can be composed of a different material such as brass or some other suitable metal.

The connecting pipes 20 can be connected to the filter tubes 16 by different ways, techniques, components, and processes. The exact connection may depend on the materials selected for the pipes 20 and filter tubes 16, among other factors. In the embodiment of FIG. 4, for example, the connecting pipes 20 are connected to the filter tube 16 by way of a press-fit in which the pipes 20 are forcibly inserted inside of the flow passage 26 of the filter tube 16 to an overlapping extent sufficient to maintain their connection and preclude gas leakage between the pipes 20 and tube 16. To facilitate the press-fit, the inserted pipe ends can be immersed in liquid nitrogen to temporarily physically shrink the pipe ends before insertion, followed by natural expansion of the pipe ends after insertion as they heat back up to ambient temperature. Alternatively, the press-fit connection can be facilitated by spring-like structures disposed on the pipe ends that are displaced inwardly upon insertion and that exert an outward force against the flow passage 26 of the structural wall 80. As another example, which is shown in the embodiment of FIG. 6, the connecting pipes 20 are connected to the filter tube 16 by tightening down the nut 56 over and to capture a flange 68 of the pipe ends. Yet in other embodiments the connection could include other components like additional fittings, parts, gaskets, seals, o-rings, washers, rivets, and clamps; can include other processes like welding, adhesion, curing, staking, and soldering; or can include a combination of these connection components and processes, as well as those detailed above.

Figure 7:
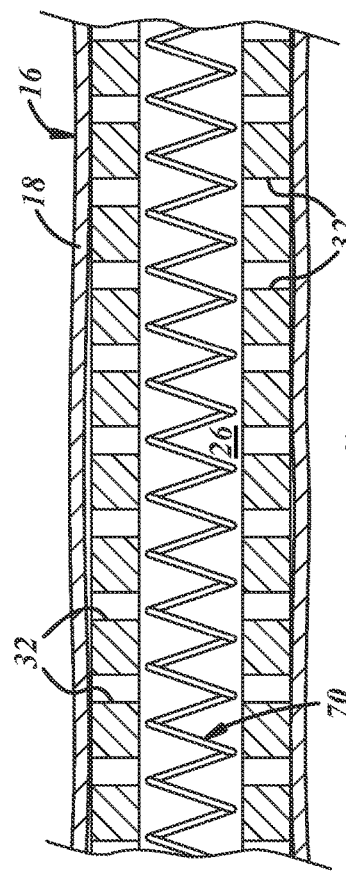
FIG. 7 is an enlarged view of a filter tube, a membrane, and a heating element.

Referring now to FIG. 7, in any of the embodiments described thus far, a heating element 70 can be located at the filter tubes 16 in order to periodically emit heat to the filter tubes 16 upon activation. The heating element 70 can take different forms including the resistance wire shown in FIG. 7, which can be made of fabric-insulated or un-insulated tungsten. Here, the resistance wire 70 is wound helically inside of the flow passage 26 and against an interior surface of the structural wall 80. Other arrangements are indeed possible, however, such as winding the wire 70 around the outside of the structural wall 80—preferably if the membrane 18 is carried on the inside of the structural wall 80—or disposing the wound heating wire 70 within the structural wall 80. Moreover, the resistance wire 70 can be a single wire routed through all of the filter tubes 16 and through all of the connecting pipes 20 with a single electrical connection to a power source, or multiple resistance wires can be routed through the different filter tubes and connecting pipes with separate electrical connections to a power source.

The heat from the heating element 70, when emitted, induces a degassing operation that rids the filter tubes 16, most notably the membrane 18, and the fuel gas storage material 14 of accumulated impurities such as water, carbon dioxide, lubricants, and other unwanted build-up that can be driven off at elevated temperatures above 150° C. Such degassing can be performed as needed to help ensure that the fuel gas storage capacity of the fuel gas storage material 14 is maintained. The degassing operation can be performed at periodic frequencies (e.g., annually) or during routine maintenance of the accompanying vehicle.

Figure 8:
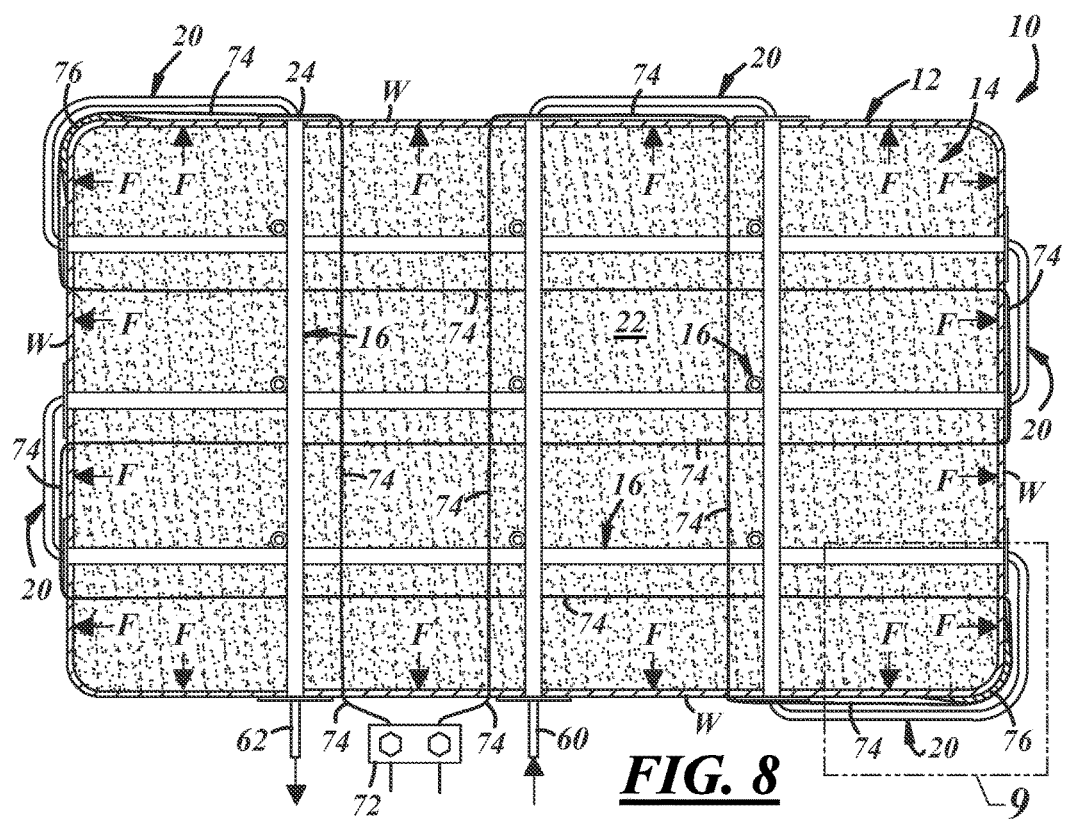
FIG. 8 is a sectional view of another embodiment of a conformable fuel gas storage tank that includes a tensioned wire.
Figure 9:
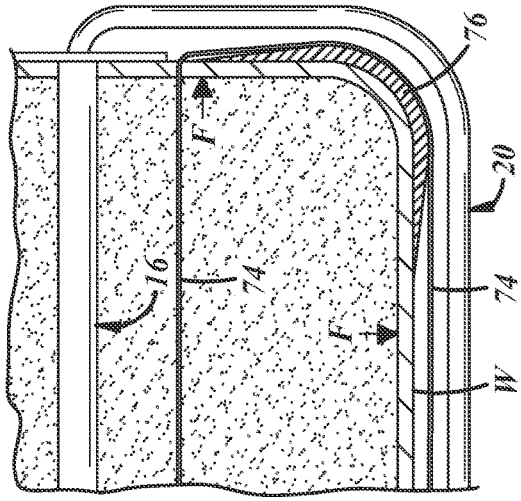
FIG. 9 is an enlarged view taken at outline 9 in FIG. 8 of an embodiment of a guide structure.

Referring now to FIGS. 8-9, an optional tensioner assembly can be equipped to the conformable fuel gas storage tank 10 to further support the shell 12 against the forces F acting outwardly on the shell walls W from the interior 22. In the embodiment shown here, the tensioner assembly includes a tensioner device 72 and a wire 74 having adequate tensile strength. The wire 74 can be composed of a metal material, such as a steel, or a more flexible material such as a carbon-based material, a polymer, or an aramid. The wire 74 is routed multiple times through the interior 22 and along the outside of the shell 12. Here, as shown, the wire 74 is fed through dedicated openings in the shell 12 that are different from the openings 24 through which the filter tubes 16 extend. The tensioner device 72 may be any known device— such as a clamp or vice—that maintains tension and tautness in the wire 74. The tensioner device 72 is preferably mounted to the shell 12 at its exterior and might only be employed when the wire 74 is composed of the more flexible materials, since the tensioner device 72 can help maintain tension of those materials. Still, the tension in the more flexible materials can be maintained by a tying arrangement of the wire 74, and without the tensioner device 72. Where the wire 74 is composed of the metal materials, on the other hand, the tensioner device 72 need not be employed and instead the wire 74 can be brought to a tensioned state and subsequently maintained taut by welding the wire 74 to the shell 12, if the shell 12 itself is also composed of a metal.

The optional tensioner assembly can be used to supplement the structural functionality of the filter tubes 16. In use, the wire 74 is routed into and out of the shell 12 and held tight in a tensioned state by the tensioner device 72 to counteract and endure the forces F acting from the interior 22 of the shell 12. In order to avoid sharp bends as the wire 74 is tightly drawn, guide structures 76 can be attached to the exterior of the shell 12, as illustrated in FIG. 9. The guide structures 76 direct the wire 74 over a comparatively blunted turn. This helps the wire 74 retain tension along its entire length and also alleviates stresses on the wire 74 at each bend into and out of the shell 12.

The above description of preferred exemplary embodiments and related examples are merely descriptive in nature; they are not intended to limit the scope of the invention as defined by the claims that follow. Each of the terms used in the appended claims should be given its ordinary and customary meaning as understood by a person of skill in the art unless specifically and unambiguously stated otherwise in the specification.

The invention claimed is:

1. A conformable fuel gas storage tank, comprising:
   a shell defining a tank interior;
   a fuel gas storage material located within the tank interior;
   a plurality of filter tubes that extend through the tank interior, each of the filter tubes having a first coupling at one portion of the shell and a second coupling at another portion of the shell, each of the filter tubes supporting the shell against outwardly-directed forces resulting from pressure within the interior of the shell via engagement between the first and second couplings of the filter tubes and their respective portions of the shell; and
   a plurality of connecting pipes, each of the connecting pipes being connected to a pair of filter tubes about an exterior of the shell so that the plurality of filter tubes are fluidly connected to each other, and wherein the plurality of filter tubes and the plurality of connecting pipes constitute a fuel gas transport system configured to convey fuel gas into the shell through an inlet, guide the fuel gas through the tank interior of the shell and the fuel gas storage material via the plurality of filter tubes, guide the fuel gas about the exterior of the shell via the plurality of connecting pipes, and convey fuel gas out of the shell through an outlet.

2. The conformable fuel gas storage tank set forth in claim 1, wherein at least one of the plurality of filter tubes extends between a first generally planar portion of the shell and a second generally planar portion of the shell.

3. The conformable fuel gas storage tank set forth in claim 1, further comprising a heating element located at one or more of the filter tubes in order to emit heat to the filter tube upon activation of the heating element.

4. The conformable fuel gas storage tank set forth in claim 1, further comprising a wire extending through a first opening in the shell and through a second opening in the shell and extending through the interior of the shell, the wire supporting the shell against outwardly-directed forces resulting from pressure within the interior.

5. The conformable fuel gas storage tank set forth in claim 4, further comprising a tensioner device for maintaining tension in the wire through the first and second openings.

6. The conformable fuel gas storage tank set forth in claim 1, wherein the first and second couplings of each of the plurality of filter tubes are decoupleable and the filter tubes can be removed from the tank upon decoupling.

7. The conformable fuel gas storage tank set forth in claim 1, wherein the first coupling of each of the plurality of filter tubes engages an outer surface of the shell at one portion and the second coupling of each of the plurality of filter tubes engages an outer surface of the shell at another portion.

8. The conformable fuel gas storage tank set forth in claim 1, wherein the first coupling, the second coupling, or each of the first and second couplings of at least one filter tube includes a flange that engages an outer surface of the shell, and the flange supports the shell against outwardly-directed forces resulting from pressure within the interior of the shell.

9. The conformable fuel gas storage tank set forth in claim 1, wherein the first coupling, the second coupling, or each of the first and second couplings of at least one filter tube includes a fitting that engages an outer surface of the shell, the fitting being a discrete component from the filter tube and supporting the shell against outwardly-directed forces resulting from pressure within the interior of the shell.

10. The conformable fuel gas storage tank set forth in claim 1, wherein the first coupling, the second coupling, or each of the first and second couplings of at least one filter tube includes a metal-worked portion formed into engagement with an outer surface of the shell, the metal-worked portion supporting the shell against outwardly-directed forces resulting from pressure within the interior of the shell.

11. The conformable fuel gas storage tank set forth in claim 1, wherein the first coupling of at least one filter tube includes a flange that engages an outer surface of the shell at one portion, and wherein the second coupling of the at least one filter tube includes a fitting that engages an outer surface of the shell at another portion, the fitting of the second coupling being a discrete component from the filter tube.

12. The conformable fuel gas storage tank set forth in claim 1, wherein each of the plurality of filter tubes includes a structural wall with a flow passage for directing fuel gas therethrough, the structural wall having at least one opening therein for passing at least a portion of the directed fuel gas from the flow passage to outside of the filter tube and into the tank interior.

13. The conformable fuel gas storage tank set forth in claim 12, wherein at least one of the filter tubes includes a membrane carried by the structural wall, the membrane permitting fuel gas to diffuse from the flow passage into the tank interior.

14. The conformable fuel gas storage tank set forth in claim 1, wherein at least one of the filter tubes includes a mesh structure with a plurality of openings therein for permitting fuel gas to diffuse from the flow passage inside the filter tube to the tank interior outside of the filter tube.

15. A conformable fuel gas storage tank, comprising:
a shell defining a tank interior;
a fuel gas storage material located within the tank interior, wherein the fuel gas storage material comprises a metal-organic-framework or a porous polymer network;
a plurality of filter tubes located at least partly within the tank interior, each of the filter tubes having a flow passage for guiding fuel gas through the filter tube, each of the filter tubes having at least one opening that permits fuel gas to diffuse out of the filter tube and into the tank interior for charging into the fuel gas storage material, and each of the filter tubes being hermetically coupled to the shell and supporting the shell against outwardly-directed forces exerted from the interior of the tank shell; and
a plurality of connecting pipes located at least partly at an exterior of the shell, each of the connecting pipes extending between filter tubes and having a passage for guiding fuel gas from one filter tube to another filter tube, and wherein the plurality of filter tubes and the plurality of connecting pipes constitute a fuel gas transport system configured to convey fuel gas into the shell through an inlet, guide the fuel gas back-and-forth through the tank interior of the shell and the fuel gas storage material, and convey fuel gas out of the shell through an outlet.

16. The conformable fuel gas storage tank set forth in claim 15, wherein each of the plurality of filter tubes includes a structural wall and a membrane carried by the structural wall, the structural wall defining a flow passage for directing fuel gas therethrough and having at least one opening therein for passing at least a portion of the directed fuel gas from the flow passage, and through the membrane, to outside of the filter tube and into the tank interior.

* * * * *